United States Patent
Tuthill et al.

(10) Patent No.: US 10,753,380 B2
(45) Date of Patent: Aug. 25, 2020

(54) RING CLIP

(71) Applicant: Hebe Studio Limited, Oxfordshire (GB)

(72) Inventors: James Tuthill, Oxford (GB); Johannes Paul, London (GB); Simon Nicholls, Northhamptonshire (GB); William Windham, Banbury (GB)

(73) Assignee: HEBE STUDIO LTD., Oxforshire (GB)

( * ) Notice: Subject to any disclaimer, the term of this patent is extended or adjusted under 35 U.S.C. 154(b) by 557 days.

(21) Appl. No.: 15/440,103

(22) Filed: Feb. 23, 2017

(65) Prior Publication Data

US 2017/0241456 A1    Aug. 24, 2017

(51) Int. Cl.
| | |
|---|---|
| F16B 5/06 | (2006.01) |
| F16B 5/00 | (2006.01) |
| F16B 2/10 | (2006.01) |
| A01K 31/08 | (2006.01) |
| A01K 31/00 | (2006.01) |
| A01K 31/22 | (2006.01) |
| A01K 1/02 | (2006.01) |
| F16B 2/08 | (2006.01) |

(52) U.S. Cl.
CPC .......... F16B 5/0607 (2013.01); A01K 1/0245 (2013.01); A01K 31/002 (2013.01); A01K 31/08 (2013.01); A01K 31/22 (2013.01); F16B 2/08 (2013.01); F16B 2/10 (2013.01)

(58) Field of Classification Search
CPC ...... F16B 5/0607; F16B 5/0012; B42F 1/006; B42F 1/02; F16L 3/12; F16L 3/10; A01K 1/0035; A01K 1/0031; A01K 31/08

USPC ........................................................... 24/487
See application file for complete search history.

(56) References Cited

U.S. PATENT DOCUMENTS

| | | | | | |
|---|---|---|---|---|---|
| 1,648,025 | A | * | 11/1927 | Molloy | A47F 5/13 206/511 |
| 3,913,187 | A | * | 10/1975 | Okuda | F16L 3/1075 24/16 PB |
| 4,840,345 | A | * | 6/1989 | Neil | F16L 3/12 24/16 PB |
| 5,118,215 | A | * | 6/1992 | Freier | F16L 3/1203 248/74.2 |
| 5,331,725 | A | * | 7/1994 | Chou | E04H 17/18 24/339 |
| 5,549,073 | A | * | 8/1996 | Askins | A01K 1/032 119/461 |
| 5,772,258 | A | * | 6/1998 | Dyer | F16L 3/1203 24/16 PB |

(Continued)

FOREIGN PATENT DOCUMENTS

CN          203035668 U     7/2013

*Primary Examiner* — Kristen C Hayes
(74) *Attorney, Agent, or Firm* — Taft Stettinius & Hollister LLP; Stephen F. Rost

(57) ABSTRACT

A ring clip for connecting two wire mesh panels. The clip has a first arm and a second arm. The arms connected at respective first ends by a hinge. A second end of the first arm defines a recess which is adapted to receive a second end of the second arm when the clip is in a closed condition. The first arm includes a first tab, and the second arm includes a second tab, such that, in the closed condition the first and second tabs are substantially opposed. The first and second tabs are substantially misaligned laterally.

18 Claims, 6 Drawing Sheets

(56) References Cited

U.S. PATENT DOCUMENTS

| | | | | |
|---|---|---|---|---|
| 6,164,605 A | * | 12/2000 | Drake | B60T 17/046 |
| | | | | 24/16 PB |
| 6,186,454 B1 | * | 2/2001 | Olsen | G09F 7/18 |
| | | | | 248/218.4 |
| 6,266,852 B1 | * | 7/2001 | Tai | B65D 63/1027 |
| | | | | 24/16 PB |
| 8,733,293 B2 | * | 5/2014 | Link | A01K 1/0017 |
| | | | | 119/474 |

* cited by examiner

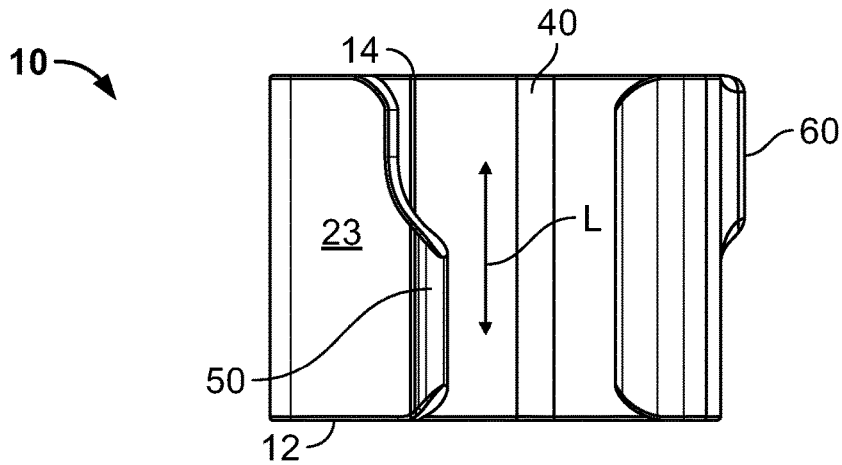
Figure 2
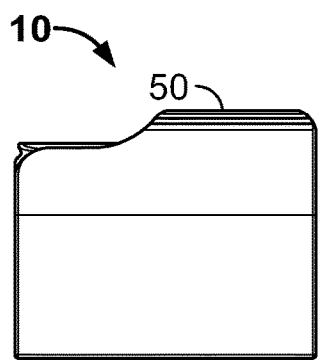
Figure 4
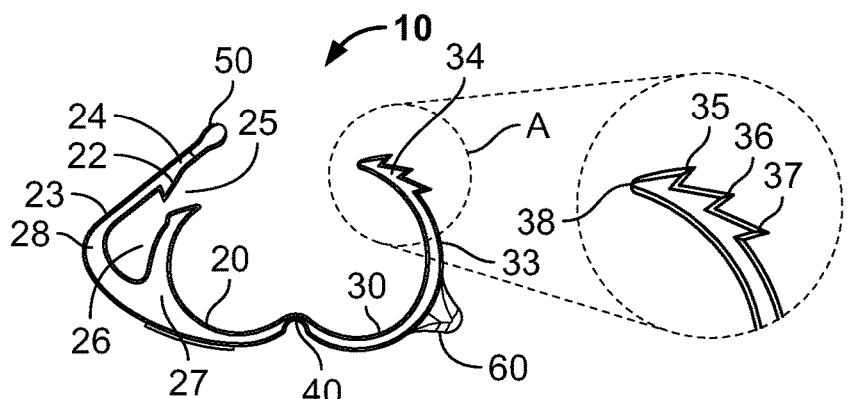
Figure 3
Figure 6
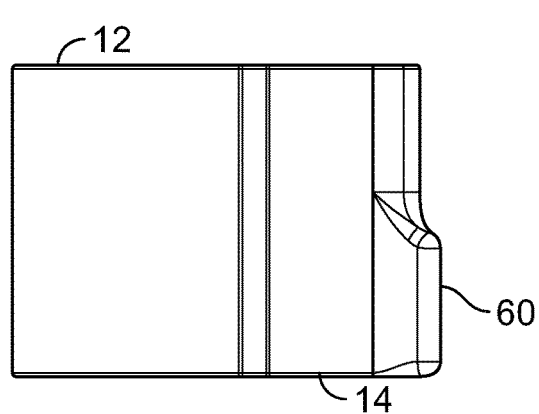
Figure 5

RING CLIP

RELATED APPLICATION

This application claims the benefit of United Kingdom Patent Application Ser. No. 1603056.1, filed on Feb. 23, 2016, the disclosure of which is hereby expressly incorporated by reference in its entirety.

FIELD OF THE DISCLOSURE

The present disclosure relates to a ring clip. In particular, the present disclosure relates to a ring clip for connecting two wire mesh panels. The present disclosure also relates to a cover for a wire mesh panel.

BACKGROUND

It is known to place ground feeding birds in outdoor cages or runs so that they may safely feed within a bounded space during the day. Such cages are often made of a series of wire mesh panels. The mesh panels may be connected to a frame which defines the size of the cage. Alternatively, the mesh panels may be joined together by fastening arrangements in a self-supporting manner.

The number of birds kept may vary such that is necessary to increase or decrease the size of the cage. It may also be desirable to reconfigure the shape of the cage so that it may be fitted in a new location. Cages comprising mesh panels supported on a frame may not be reconfigured to alternate shapes to fit within new locations. Cages comprising mesh panels joined together by fastening arrangements require dedicated tools to dismount the fastening arrangements. The process of removing and reattaching the fasting arrangements is time consuming.

SUMMARY

According to a first aspect of the present disclosure there is provided a ring clip for connecting wire mesh panels, the clip including a first arm and a second arm, the first arm and the second arm being connected at respective first ends by a hinge, a second end of the first arm defining a recess, the recess being adapted to receive a second end of the second arm when the clip is in a closed condition, wherein the first arm includes a first tab extending therefrom, and the second arm includes a second tab extending therefrom, such that, in the closed condition the first and second tabs are substantially opposed, wherein the first and second tabs are substantially misaligned laterally.

The tabs facilitate closing of the ring clip such that the ring clip may be squeezed closed by applying opposed pressure to the first and second tabs.

The first and second tabs may be elongate and extend for about half the lateral extent of the respective first and second arms. The first and second tabs may have a lateral clearance therebetween. This arrangement of tabs further facilitates closing of the ring clip, which may be closed, for example, using the finger and thumb of one hand on the first and second tabs respectively.

The first tab may extend in the plane of the second end of the first arm. This arrangement allows the first tab to act as a guide to direct the second end of the second arm towards the recess of the first arm when the clip is being closed.

The second end of the second arm includes at least one barb. The barb substantially prevents opening of the clip.

The second arm may include a plurality of barbs for sequential engagement in said recess to progressively close said ring. The closed size of the ring clip may thereby be varied according to the configuration of the panels to be secured together.

The second end of the first arm may include a projection arranged at a mouth of the recess for snap fit connection with the second arm in the closed condition. This provides a secure connection and a tactile feedback to the user as the clip is closed.

The mouth of the recess may be divergent. The divergent mouth provides a channel to facilitate entry of the end of the second arm into the recess as the clip is closed.

The second end of the second arm may be tapered. The tapered end of the second arm facilitates entry of the end of the second arm into the recess as the clip is closed.

The ring clip may be a one-piece molding. The hinge may be a living hinge. The ring clip may therefore be manufactured of plastic at low cost, as there are no assembly costs associated with a one piece molding.

The ring clip may be releasable from the closed condition to an open condition. Thus the clip may be used repeatedly.

A slot may be defined between the first and second tabs. This may further facilitate release of the ring clip to an open condition as a tool may be inserted into the slot and twisted, so as to apply the requisite opposed pressure on the first and second tabs to open the ring clip.

According to a second aspect of the present disclosure there is provided a cover for a wire mesh panel, the cover including a first cover plate and a second cover plate, the first and second cover plates each defining an inner surface and an outer surface, wherein the inner surface of the first cover plate has a projection and the inner surface of the second cover plate has a housing adapted to receive said projection, such that, in use, the first and second cover plates are arranged either side of the wire mesh panel with their respective inner surfaces directly opposed, the projection engaging with the housing to clamp the wire mesh panel between the first and second cover plates.

Each inner surface may have a projection and each inner surface may have a corresponding housing.

The projections and housings may be arranged about the geometric center of the respective first and second cover plates.

The or each projection may be adapted to engage with the or each housing with a snap fit. The snap fit allows the cover to be fitted manually. The use of tools is not required.

Each inner surface may include a spacer. The spacer may be integral with the inner surface.

The housings and spacers may include respective wire guides. The wire guides may be tapered. The wires of a wire mesh panel may then be inserted into a V-shaped slot defined by opposed tapered wire guides, to frictionally hold the cover to the wire mesh panel.

The first and second cover plates may be identical. This ensures that the cover plate is reversible and may be fitted at any orientation.

According to a third aspect of the present disclosure there is provided a wire cage including one or both of a ring clip according to the first aspect of the present disclosure and a cover according to the second aspect of the present disclosure.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a plan view of the ring clip of FIG. 1;

FIG. 3 is a side elevation of the ring clip of FIG. 1;

FIG. 4 is an end elevation of the ring clip of FIG. 1;

FIG. 5 is a bottom elevation of the ring clip of FIG. 1;

FIG. 6 is an enlarged view of the encircled areas denoted "A" of FIG. 3;

FIG. 11 is a front view of the first plate of FIG. 10a;

FIG. 12 is an end elevation the first plate of FIG. 10a;

FIG. 13 is a plan view of the first plate of FIG. 10a;

FIG. 14 is a rear view of the first plate of FIG. 10a;

DETAILED DESCRIPTION

Figure 1:
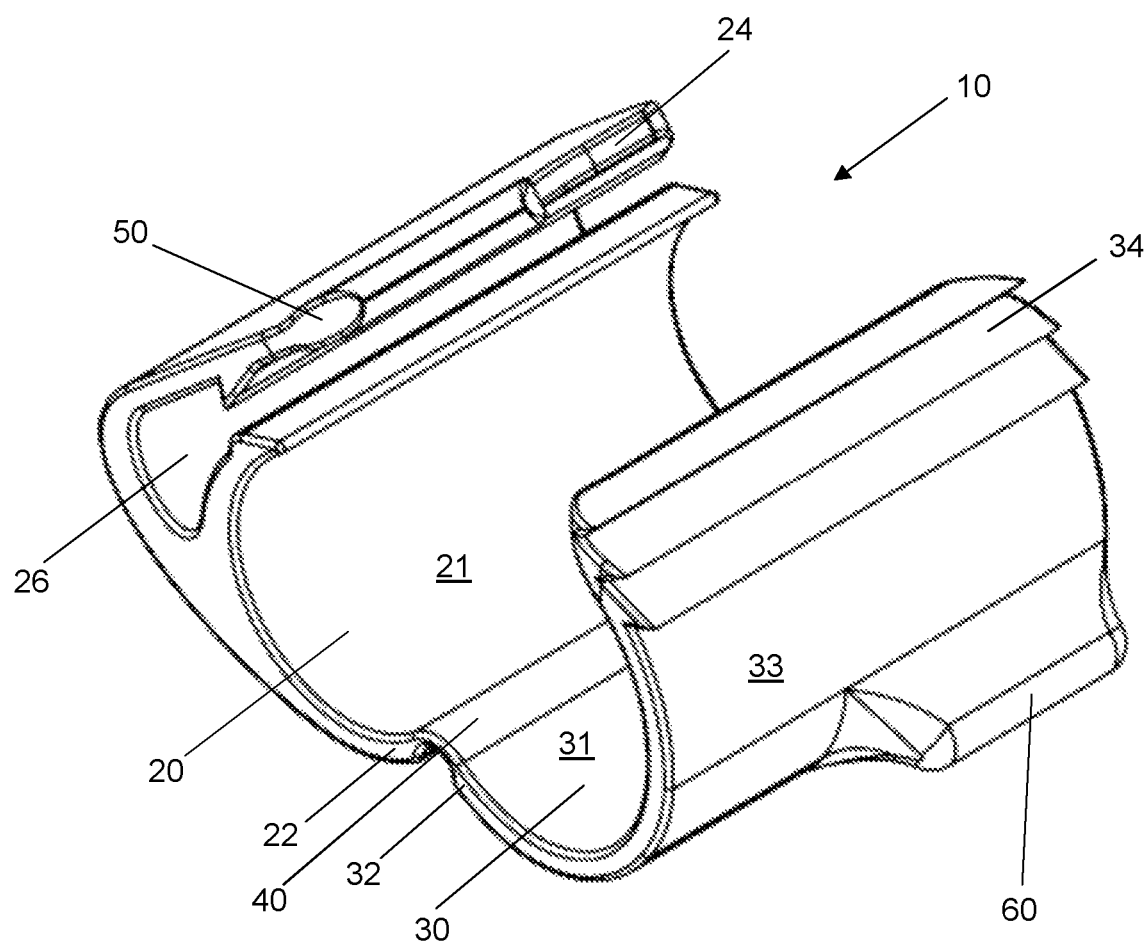
FIG. 1 is a perspective view of the ring clip in an open condition.

As shown in FIGS. 1-6, a molded plastic ring clip 10 has a first arm 20 and a second arm 30. The first arm 20 has a first end 22 and a second end 24. The second arm 30 has a first end 32 and a second end 34. The arms 20, 30 are substantially C-shaped such that when the respective first and second ends 22, 32, 24, 34 of the first and second arms 20, 30 are brought together a ring shape is defined. The first arm 20 and the second arm 30 are connected at respective first ends 22, 32 by a hinge 40.

The hinge 40 is a living hinge and extends between an inner surface 21 of the first arm 20 and an inner surface 31 of the second arm 30. The hinge 40 extends for the lateral extent of the ring clip 10. Thus the term lateral is used to define the dimension along the hinge 40 of the ring clip 10.

The first arm 20 has a first tab 50 extending from the second end 24 of the first arm 20. The first tab 50 is elongate and extends for about half the lateral extent of the first arm 20. The first tab 50 extends in the plane of the second end 24 of the first arm 20. This is best shown in FIG. 3, where an outer surface 23 of the first arm 20 is substantially parallel with an outer surface of the first tab 50.

The second end 24 of the first arm 20 defines a recess 26. The recess 26 is U-shaped in cross-section, such that the second end 24 of the first arm 20 is split into an inner limb 27 and an outer limb 28. The recess 26 has a divergent mouth 25, defined by the ends of the inner and outer limb 27, 28. A projection 22 extends from the inside surface of the outer limb 28 at the end of the first arm 20 into the mouth 25.

The second arm 30 has a second tab 60 extending from the second arm 30. The second tab 60 is elongate and extends for about half the lateral extent of the second arm 30. The second tab 60 extends from an outer surface 33 of the second arm 30.

The first and second tabs 50, 60 are substantially misaligned laterally. That is, the tabs 50, 60 are substantially misaligned in a lateral direction indicated by arrow L that extends from a proximal edge 12 of the ring clip 10 to a distal edge 14 of the ring clip 10. This is best seen in FIG. 2, where the first tab 50 extends laterally (i.e., in the lateral direction L) from the proximal edge 12 of ring clip 10 and the second tab 60 extends laterally (i.e., in the lateral direction L) from the distal edge 14 of ring clip 10.

The second end 34 of the second arm 30 is tapered such that it terminates in a point 38. The second end 34 of the second arm 30 defines a first barb 35, a second barb 36, and a third barb 37. The three barbs 35, 36, 37 are arranged for sequential engagement in the recess 26 to progressively close the ring clip 10. The projection 22 extending from the inside surface of the outer limb 28 at the end of the first arm 20 provides a snap fit connection with the second arm 30 in a closed condition. In the closed condition, a slot 62 is defined between the first and second tabs 50, 60. In the closed condition, the first and second tabs 50, 60 are substantially opposed.

In use the ring clip 10 is wrapped around adjacent wire mesh panels such that wire from two or more panels passes between the space defined between the arms. Holding the first tab 50 securely with a forefinger, the second arm 30 is moved towards the recess 26 in the first arm 20 by pressure applied by the thumb on the second tab 60, the second arm 30 hinging relative to the first arm 20 about hinge 40.

Continued pressure on the second tab 60 to squeeze the first and second arms 20, 30 together results in the second arm 30 being guided by the inner surface of the first tab 50 towards the mouth 25 of the recess 26.

The tapered end of the second end 34 of the second arm 30 passes through the mouth 25 of the recess 26, causing the inner and outer limb 27, 28 of the first arm 20 to resile as the cross section of the tapered end increases at the first barb 35. Once the first barb 35 has passed the projection 22 at the mouth 25 of the recess 26, the inner and outer limbs 27, 28 of the first arm 20 resile back to their original position, locking the second end 34 of the second arm 30 in the recess 26.

Figure 9:
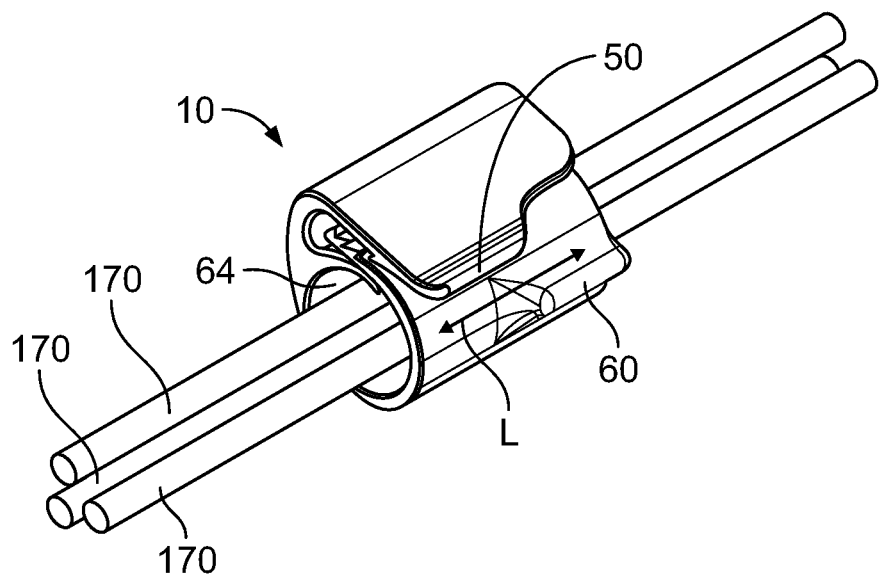
FIG. 9 is a perspective view of the ring clip of FIG. 1 in a closed condition.
Figure 10A:
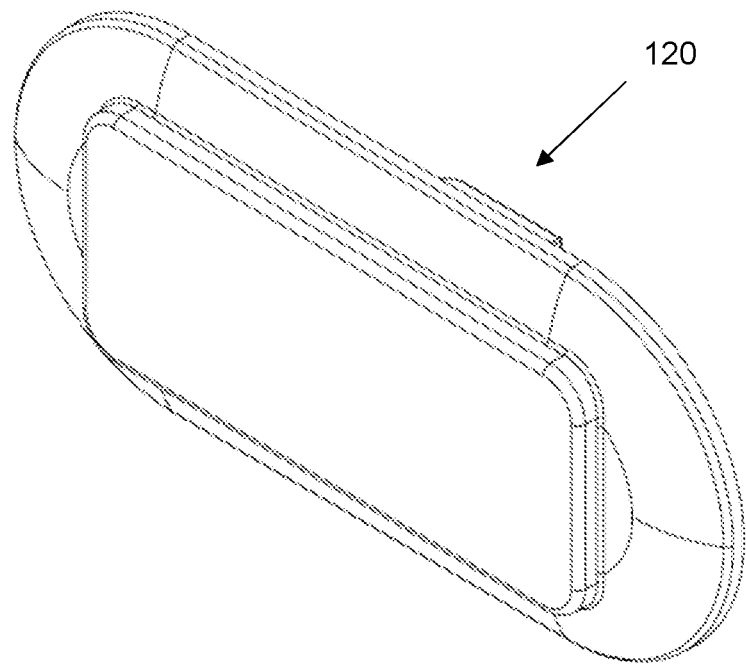
FIG. 10a is a front perspective view of a first plate of the cover.
Figure 10B:
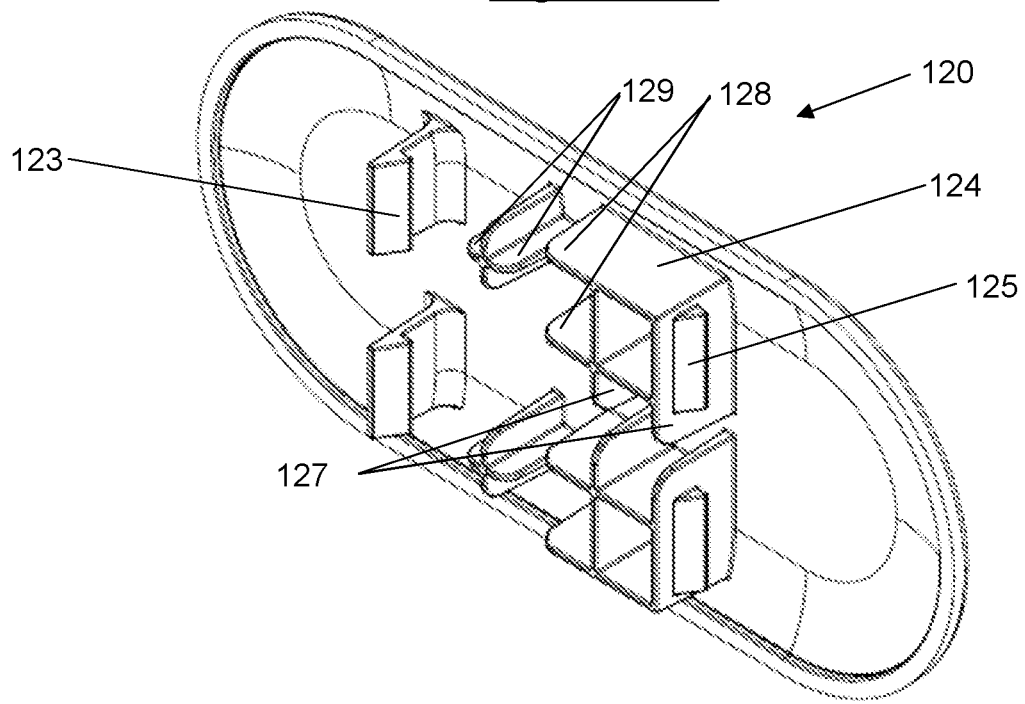
FIG. 10b is a rear perspective view of a first plate of the cover.
Figure 11:
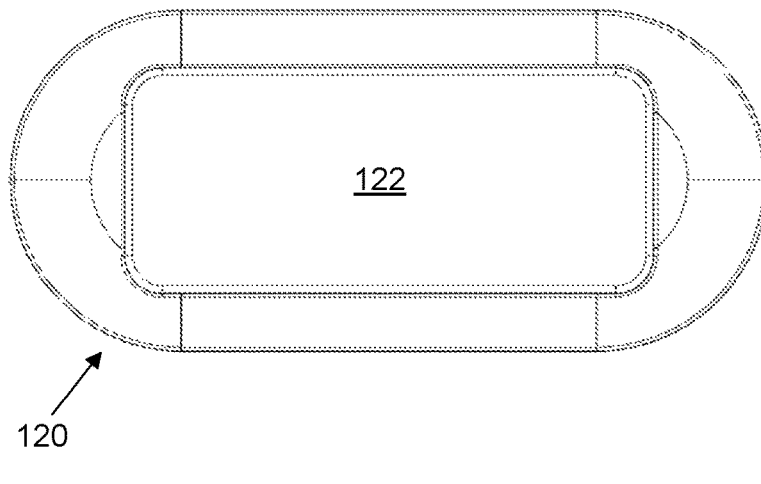
Figure 12:
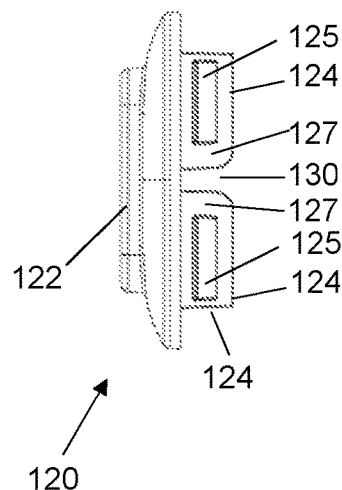
Figure 13:
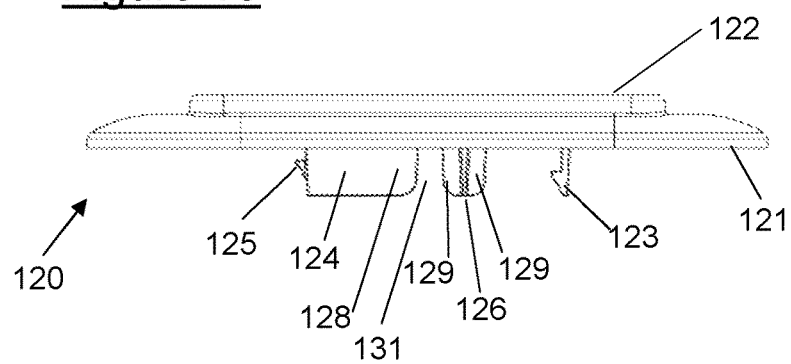
Figure 14:
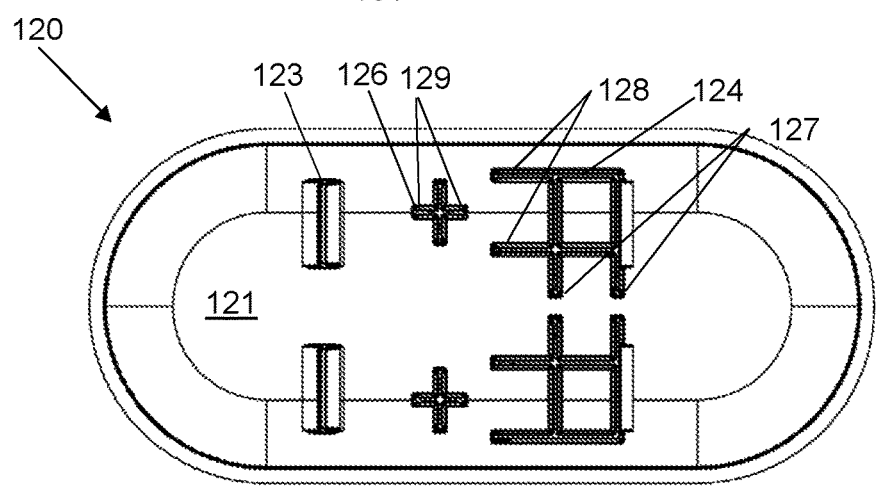
Figure 15:
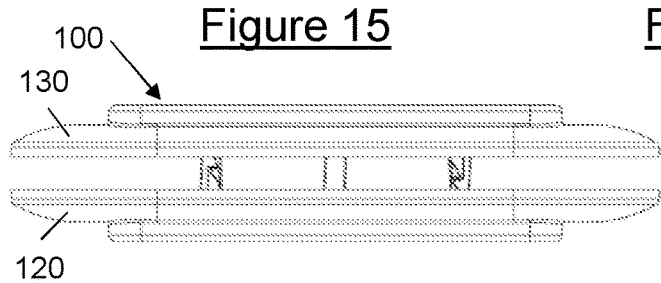
FIG. 15 is a plan view of the cover.
Figure 16:
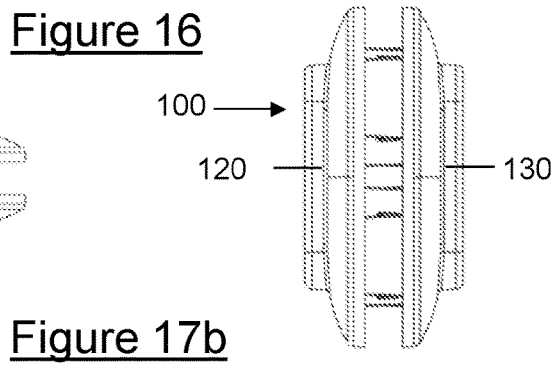
FIG. 16 is an end elevation of the cover.

The ring clip 10 is now closed about the wire mesh panels, in the ring clip 10 closed condition. As best seen in FIG. 9, when the ring clip 10 is in the closed condition, the clip 10 defines a passage 64 that extends in the lateral direction L to receive a portion of one or more wires 170 associated with each mesh panel. The first and second tabs 50, 60 are misaligned laterally (i.e., in the lateral direction L) and there is a lateral spacing between the first and second tabs 50, 60.

Figure 7:
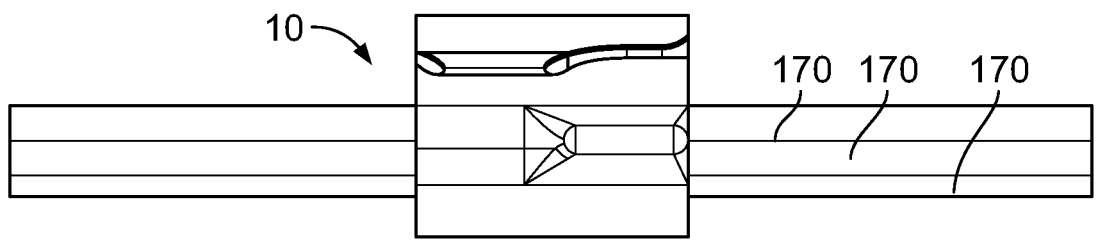
FIG. 7 is a plan view of the ring clip of FIG. 1 in a closed condition.
Figure 8:
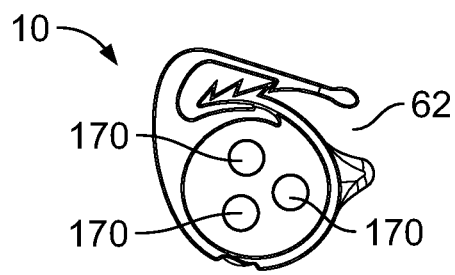
FIG. 8 is an end elevation of the ring clip of FIG. 1 in a closed condition.

In the closed condition, the ring clip 10 retains a portion of the one or more wires 170 associated with each wire mesh panel (see, e.g., FIGS. 7 to 9). The space defined within the closed ring clip 10 may be reduced.

Further pressure on the second tab 60 presents the second barb 36 to the projection 22 at the mouth 25 of the recess 26, which again causes the inner and outer limbs 27, 28 to resile. Once the second barb 36 has passed the projection 22, the inner and outer limbs 27, 28 of the first arm 20 resile back to their original position, locking a further portion of the second end 34 of the second arm 30 in the recess 26, thus reducing the space defined between the first and second arms 20, 30.

Yet further pressure on the second tab 60 presents the third barb 37 to the projection 22, which again causes the inner and outer limbs 27, 28 to resile. Once the third barb 37 has passed the projection 22, the inner and outer limbs 27, 28 of the first arm 20 resile back to their original position, locking yet a further portion of the second end 34 of the second arm 30 in the recess 26, thus further reducing the space defined between the first and second arms 20, 30.

The ring clip 10 may be released from the closed condition to an open condition as follows. Pressure is applied to the inside surface of first tab 50 to open the constriction at the mouth 26, as the first tab 50 acts a lever. Simultaneous pressure on the inside surface of second tab 60, to draw the second arm 30 away from the first arm 20, results in the second arm 30 hinging about hinge 40 and withdrawing the first barb 35 through the now widened constriction in the mouth 25.

The opposed twisting pressure may be applied using the forefinger and thumb in the opposite sense compared to that described above with respect to the process for closing the ring clip 10. Simultaneous pressure to the respective inside surfaces of the first and second tabs 50, 60 may be easily applied due to the lateral misalignment of the first and second tabs 50, 60 and the lateral spacing therebetween.

Alternatively, a tool with a flat face, such as a coin, may be inserted into the slot defined between the first and second tabs 50, 60 in the ring clip closed condition. Twisting of the tool applies opposed pressure to the first and second tabs 50, 60 to release the ring clip 10.

The ring clip 10 may be formed from plastic. The ring clip 10 is a one-piece molding.

A cover 100 has a first cover plate 120 and a second cover plate 130 (see FIGS. 10a to 17d). The first cover plate 120 and second cover plate 130 are identical, such that only the first cover plate 120 shall be described in detail. The first cover plate 120 has an inner surface 121 and an outer surface 122. The inner surface 121 has two vertically aligned barbed projections 123. The inner surface 121 has two vertically aligned housings 124. The housings 124 each include ramped protrusions 125. The housings 124 each include two horizontal wire guides 127. The horizontal wire guides are on opposed upper and lower sides of the housings 124 respectively. The housings 124 each include two vertical wire guides 128 on the same lateral side of the housings 124 respectively. Thus the two horizontal wire guides 127 of the vertically aligned housings 124 extend toward one another, and the two vertical wire guides 128 extend in the same lateral direction, toward the geometric center of the first cover plate 120.

Each barbed projection 123 is horizontally aligned with a respective housing 124. The barbed projections 123 and housings 124 are arranged about the geometric center of the first cover plate 120.

The inner surface 121 has two spacers 126. Each spacer 126 is located between a respective barbed projection 123 and a housing 124. Each spacer 126 is provided with two vertical wire guides 129, extending in opposite lateral directions. A first of the two vertical wire guides 129 extends laterally towards the barbed projection 123, and a second of the two vertical wire guides 129 extends laterally towards the housing 124.

The horizontal wire guides 127 and vertical wire guides 128, 129, of the housings 124 and spacers 126 are tapered. Between the horizontal wire guides 127 of the upper and lower surfaces of the housings 124, a V-shaped slot 130 is defined, (shown best in FIG. 12). Similarly, between the vertical wire guides 128, 129 of the housing 124 and spacer 126 a V-shaped slot 131 is defined (shown best in FIG. 13). It is to be understood that a first V-shaped slot 131 is defined between the vertical wire guides 128, 129 of the housing 124 and spacer 126 of the same, i.e. first cover plate 120, whilst a second V-shaped slot 131 is defined between the vertical wire guide 129 of the spacer 126 of the first cover plate 120 and the vertical wire guide 128 of the housing 124 of the second cover plate 130, as the first and second cover plates 120, 130 are brought together.

Figure 17A:
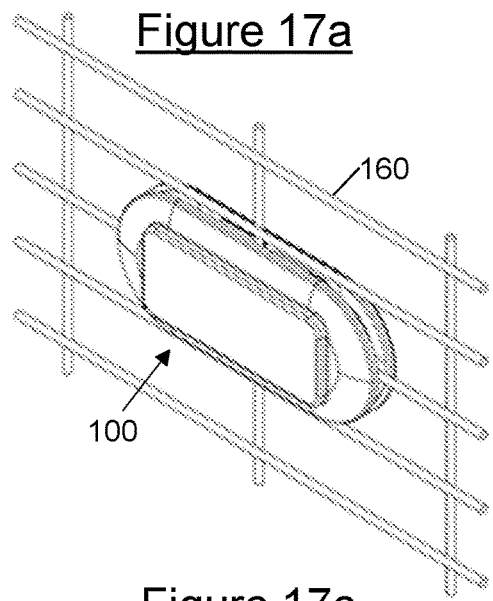
FIGS. 17a to 17d are perspective views of the cover fitted to a wire frame.
Figure 17B:
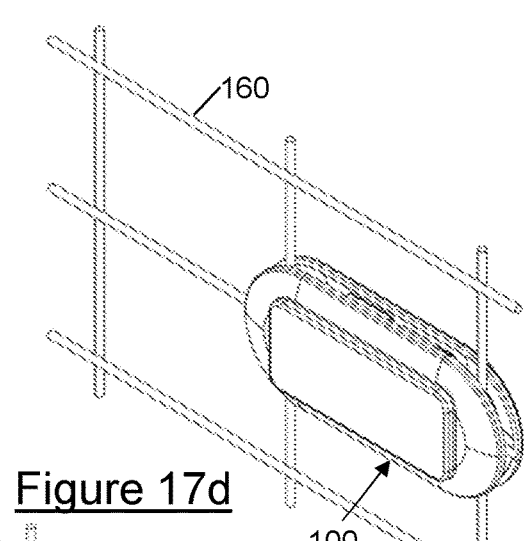
Figure 17C:
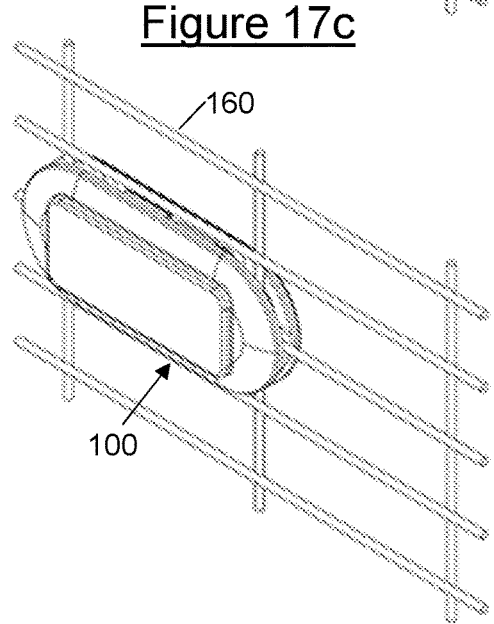
Figure 17D:
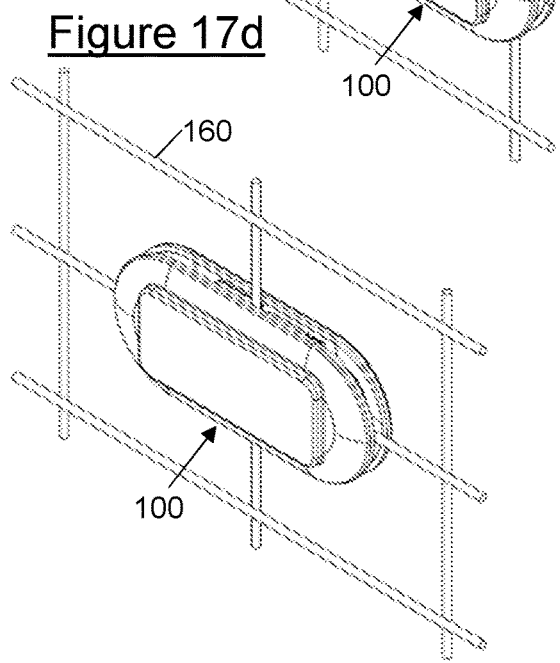

In use, the first and second cover plates 120, 130 are arranged either side of a wire mesh panel (see FIGS. 15 to 17d), with their respective inner surfaces 121 directly opposed. The first and second cover plates 120, 130 are aligned with the wire mesh panel 160 such that the wire elements are inserted into the V-shaped slots described above. The cover 100 is thereby attached to the wire mesh panel 160 by friction. As shown in FIGS. 17a and 17d, the wire elements may be inserted into the V-shaped slot defined by both the horizontal wire guides 127 and vertical wire guides 128. Alternatively, as shown in FIGS. 17b and 17c, the wire elements may be inserted into the V-shaped slot defined by the horizontal wire guides 127 only.

To secure the cover 100, the first and second cover plates 120, 130 are pressed together, such that each barbed projection 123 engages with the ramped protrusion 125 of the respective housing 124, the barbed projection 123 resiling as it passes over the ramped protrusion 125 to clamp a wire mesh panel 160 between the first and second cover plates 120, 130 with a snap fit. The wire mesh panel 160 may be part of a wire cage.

The cover plate 100 may be used to display information regarding the contents or the maintenance of the cage. The labelling may provide a warning.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A ring clip for connecting mesh wire panels, comprising:
   a first arm and a second arm, the first arm and the second arm being connected at respective first ends by a hinge, and
   a second end of the first arm defining a recess, the recess being adapted to receive a second end of the second arm when the clip is in a closed condition in which the ring clip defines a passage that extends in a lateral direction to receive a portion of one or more wires associated with each wire mesh panel,
   wherein the first arm includes a first tab extending therefrom, and the second arm includes a second tab extending therefrom, such that, in the closed condition the first and second tabs are substantially opposed,
   wherein the first and second tabs are substantially misaligned in the lateral direction, and
   wherein the first and second tabs extend in the lateral direction substantially without being aligned with one another.

2. The ring clip of claim 1 wherein the first and second tabs are elongate and extend for about half the lateral extent of the respective first and second arms.

3. The ring clip of claim 2 wherein the first and second tabs have a lateral clearance therebetween.

4. The ring clip of claim 1, wherein the first tab extends in the plane of the second end of the first arm.

5. The ring clip of claim 1, wherein the second end of the second arm includes at least one barb.

6. The ring clip of claim 5, wherein the second end of the second arm includes a plurality of barbs for sequential engagement in said recess to progressively close said ring.

7. The ring clip of claim 1, wherein the second end of the first arm includes a projection arranged at a mouth of the recess for snap fit connection with the second arm in the closed condition.

8. The ring clip of claim 1, wherein the mouth of the recess is divergent.

9. The ring clip of claim 1, wherein the second end of the second arm is tapered.

10. The ring clip of claim 1, wherein the ring clip is a one-piece mold.

11. The ring clip of claim 1, wherein the hinge is a living hinge.

12. The ring clip of claim 1, wherein in the closed condition, a slot is defined between the first and second tabs.

13. A wire cage, comprising:
   at least two mesh panels;
   a ring clip for coupling the at least two mesh panels to one another, the ring clip comprising:
      a first arm and a second arm, the first arm and the second arm being connected at respective first ends by a hinge, and
      a second end of the first arm defining a recess, the recess being adapted to receive a second end of the second arm when the clip is in a closed condition in which the ring clip defines a passage that extends in a lateral direction to receive a portion of one or more wires associated with the at least two mesh panels,
      wherein the first arm includes a first tab extending therefrom, and the second arm includes a second tab extending therefrom, such that, in the closed condition the first and second tabs are substantially opposed, and
      wherein the first and second tabs are substantially misaligned in the lateral direction.

14. The wire cage of claim 13, wherein the first and second tabs extend in the lateral direction substantially without being aligned with one another.

15. A ring clip for connecting wire mesh panels, the ring clip comprising:
   a first arm and a second arm, the first arm and the second arm being connected at respective first ends by a hinge, and
   a second end of the first arm defining a recess, the recess being adapted to receive a second end of the second arm when the ring clip is in a closed condition,
   wherein the second end of the second arm includes at least one barb and the second end of the first arm includes a projection arranged at a mouth of the recess for snap fit connection with the at least one barb in the closed condition of the ring clip,
   wherein the first arm includes a first tab extending therefrom and the second arm includes a second tab extending therefrom such that, in the closed condition of the ring clip, the first and second tabs are substantially opposed,
   wherein in the closed condition of the ring clip, a slot is defined between facing surfaces of the first and second tabs,
   wherein the ring clip may be released to an open condition by simultaneous application of pressure to the facing surfaces of the first and second tabs to disconnect the at least one barb and the projection, and
   wherein the first tab extends in the plane of the second end of the first arm.

16. The ring clip of claim 15, wherein when the ring clip is in the closed position, the ring clip defines a passage that extends in a lateral direction to receive a portion of one or more wires associated with each wire mesh panel, and wherein the first and second tabs are substantially misaligned in the lateral direction.

17. The ring clip of claim 15, wherein the first and second tabs are elongate and extend for about half the lateral extent of the respective first and second arms.

18. The ring clip of claim 15, wherein when the ring clip is in the closed position, the ring clip defines a passage that extends in a lateral direction to receive a portion of one or more wires associated with each wire mesh panel, and wherein the first and second tabs extend in the lateral direction substantially without being aligned with one another.

* * * * *